United States Patent
Matsuno

(10) Patent No.: US 6,754,658 B1
(45) Date of Patent: Jun. 22, 2004

(54) DATABASE SERVER PROCESSING SYSTEM, METHOD, PROGRAM AND PROGRAM STORAGE DEVICE

(75) Inventor: Hideki Matsuno, Osaka (JP)

(73) Assignee: Hitachi, Ltd., Tokyo (JP)

( * ) Notice: Subject to any disclaimer, the term of this patent is extended or adjusted under 35 U.S.C. 154(b) by 242 days.

(21) Appl. No.: 09/645,407

(22) Filed: Aug. 25, 2000

(30) Foreign Application Priority Data

Feb. 16, 2000 (JP) .................................... 2000-043507

(51) Int. Cl.[7] .............................................. G06F 7/00
(52) U.S. Cl. ....................... 707/9; 707/102; 707/10; 707/8
(58) Field of Search ................ 707/9–10, 100–104, 707/8, 200–203, 223

(56) References Cited

U.S. PATENT DOCUMENTS

| | | | |
|---|---|---|---|
| 5,832,491 A | * 11/1998 | Tatsumi et al. ............ 707/101 |
| 6,005,571 A | * 12/1999 | Pachauri .................... 345/764 |
| 6,052,688 A | * 4/2000 | Thorsen ...................... 707/100 |
| 6,085,191 A | * 7/2000 | Fisher et al. .................. 707/9 |
| 6,122,741 A | * 9/2000 | Patterson et al. ........... 713/200 |
| 6,178,422 B1 | * 1/2001 | Tada et al. ..................... 707/9 |
| 6,236,996 B1 | * 5/2001 | Bapat et al. .................... 707/9 |
| 6,275,824 B1 | * 8/2001 | O'Flaherty et al. ............ 707/9 |
| 6,275,825 B1 | * 8/2001 | Kobayashi et al. ............ 707/9 |
| 6,418,542 B1 | * 7/2002 | Yeager ........................ 714/38 |
| 6,446,092 B1 | * 9/2002 | Sutter ......................... 707/203 |
| 6,457,007 B1 | * 9/2002 | Kikuchi et al. .............. 707/10 |
| 6,505,232 B1 | * 1/2003 | Mighdoll et al. ........... 709/203 |
| 6,507,837 B1 | * 1/2003 | De La Huerga .............. 707/3 |
| 6,513,047 B1 | * 1/2003 | Talley ........................ 707/200 |
| 6,516,317 B1 | * 2/2003 | Samar et al. .................. 707/9 |
| 6,526,406 B1 | * 2/2003 | Suzuki et al. ................ 707/10 |

FOREIGN PATENT DOCUMENTS

| | | |
|---|---|---|
| JP | 7-28679 | 1/1995 |
| JP | 9-325906 | 12/1997 |

* cited by examiner

*Primary Examiner*—Greta Robinson
*Assistant Examiner*—Miranda Le
(74) *Attorney, Agent, or Firm*—Mattingly, Stanger & Malur, P.C.

(57) ABSTRACT

A database processing apparatus includes a user connection information recording unit for storing connection requests from users in response to database connection processing requests by at least one user requiring for database processing, and database resource allocation unit for making a user occupy a database resource of a database system, in response to a transaction execution request from the user, with a minimum transaction unit ensured with an equivalency to a database processing, and execute a transaction stored in the database resource, thereby carrying out utilization of the system by a number of users.

4 Claims, 6 Drawing Sheets

FIG. 5

| USER | PRIORITY INDICATING INFORMATION | |
|---|---|---|
| 501 — USER 1 | 50 | 511 |
| 502 — USER 2 | 10 | 512 |
| 503 — USER 3 | 50 | 513 |
| 504 — USER n | 10 | 514 |

FIG. 6

| USER | AVERAGE PROCESSING TIME (ms) | |
|---|---|---|
| 601 — USER 1 | 30 | 611 |
| 602 — USER 2 | 100 | 612 |
| 603 — USER 3 | 50 | 613 |
| 604 — USER n | 20 | 614 |

DATABASE SERVER PROCESSING SYSTEM, METHOD, PROGRAM AND PROGRAM STORAGE DEVICE

BACKGROUND OF THE INVENTION

The present invention relates to a database server, and particularly to a database server processing method for improving the utilization rate of database resources.

A conventional database processing system occupies database treatment resources such as memory resources, database processing task resources and the like from the time when a request for connection with the database is made by a user to the time when the user requests to disconnect the database.

In on-line database access operations, the database may often remain connected even in the period of time when no actual data access is made, during which the database resources are occupied. Therefore, the same number of database resources as that of users who may request to connect to them at the same time must be prepared.

As an approach to make it possible such mass connections with users, there is a method of increasing the memory utilization rate by saving the memory content from a main storage unit to an auxiliary storage unit, as disclosed in Japanese Patent Laid-open No. 9-325906.

Since the database resources such as memory resources and the like are allocated to users that do not carry out the data access at the same time, there is a difficulty such that the number of users may be restricted to connect to the database due to the limitation of memory capacity.

With the number of users drastically increased, a large-scale database system may be required such that the number of users for a single database server is several tens of thousands. There is also a difficulty to require database processing resources such as an extremely large memory resources and the like.

SUMMARY OF THE INVENTION

It is a primary object of the present invention to provide a large-scale database server system capable of effectively carrying out utilization of the system by a number of users within the limited database resources.

In order to achieve the aforementioned object, the present invention provides a database processing method where, in response to database connection processing requests by one or more users who request database processings, each user's request of connection is saved, and in accordance to the user's transaction execution request, the user is allowed to occupy a database resource in a database system in a minimum transaction unit ensured with the equivalency to the database processing, and the transaction stored in the database resource is executed so as to reduce the database resource occupying time, thereby increasing the utilization rate of database resources.

By replacing first authentic information of one user requesting a database processing with second authentic information as the user has a database access right equivalent to the other users having the same level as the one user, when the database resources are being connected to the database with the second authentic information used and authentic information associated with a transaction that is intended to execute is the same as the second authentic information, the transaction executes without carrying out both the database connection processing and the database disconnection processing for the database.

In the present invention, transaction processing information from respective users requesting database processing is stored, and when an amount of transaction processing requests beyond the upper limit thereof which can be placed in a database resource are received, a queue for the transaction processings is made.

Referring to the stored user information and a priority indicating information which have been prepared for respective users who request database processings, the order of allocating the database resources is determined with a queue prepared for the transaction processings, thereby increasing the efficiency of the processing for the users requesting the database processings.

Moreover, the present invention provides a computer readable recording medium on which a database server processing program is recorded.

The database server processing program has a step of storing respective users' connection requests in response to database connection processing requests made by one or more users who request database processing; a step of allowing the respective users to occupy database resources in a database system in a minimum transaction unit ensured with the equivalency to the database processing in accordance with the respective users' transaction execution, a step of replacing a plurality of authentic information authenticating the users requesting database treatment who have an equivalent level of database access right by only one authentic information; and a step of executing the transaction which is placed in the database resources without effecting the database connection processings and the database disconnection processings when the one authentic information is effecting the connection between the database resources and the database, and when authentic information relating to a transaction to be executed is the same as the one authentic information.

BRIEF DESCRIPTION OF THE DRAWINGS

FIG. 5 is a table showing an example of priority indicating information.

FIG. 6 is a table showing an example of stored user information.

DESCRIPTION OF THE EMBODIMENTS

Embodiments of the present invention is described hereunder in more detail with reference to drawings.

Figure 1:
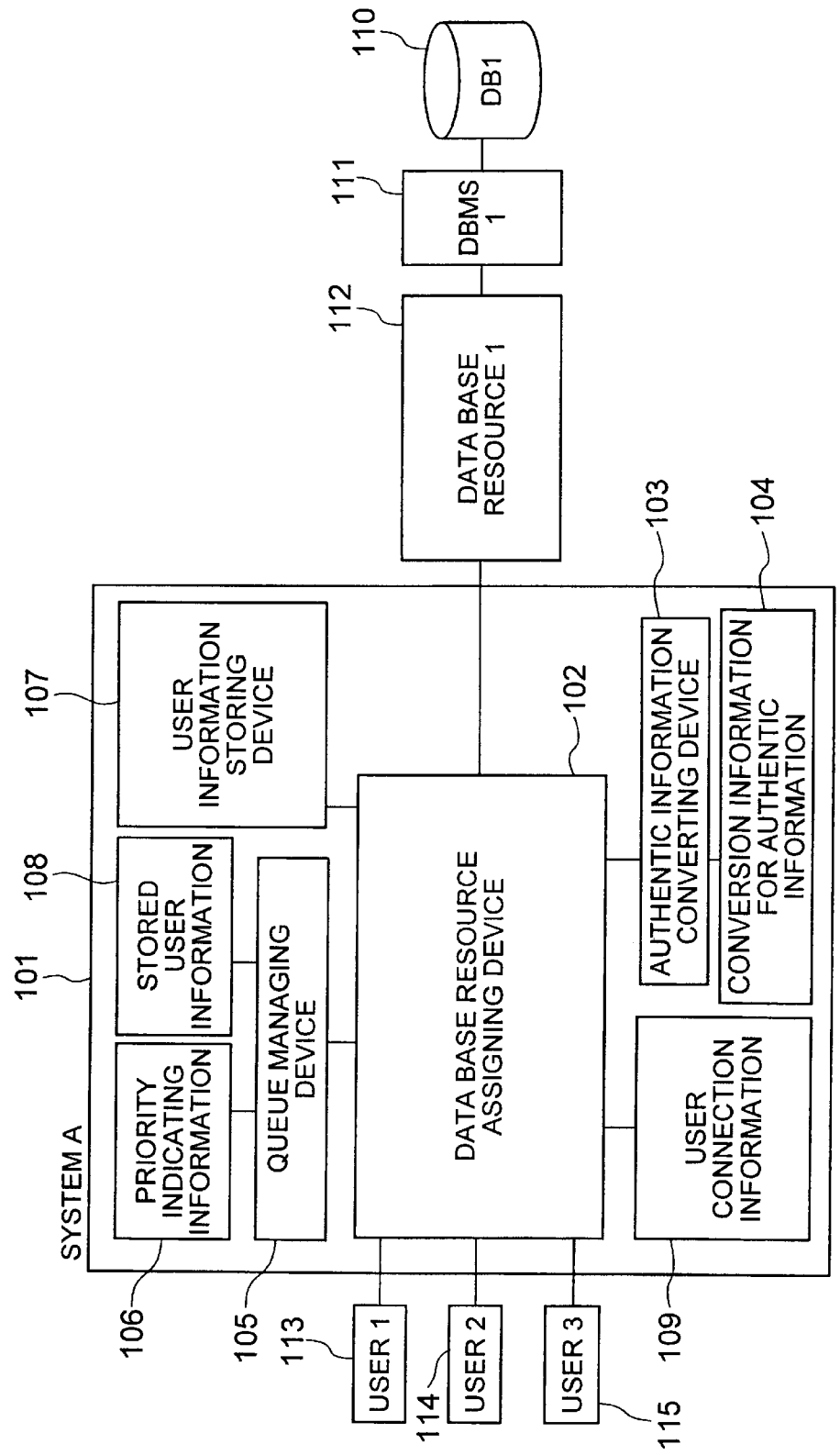
FIG. 1 is a drawing showing an example of an arrangement of a database server according to the present invention.

FIG. 1 shows an example of an arrangement of a database server which can process database processing requests from a plurality of users with one database resource used.

Figure 2:
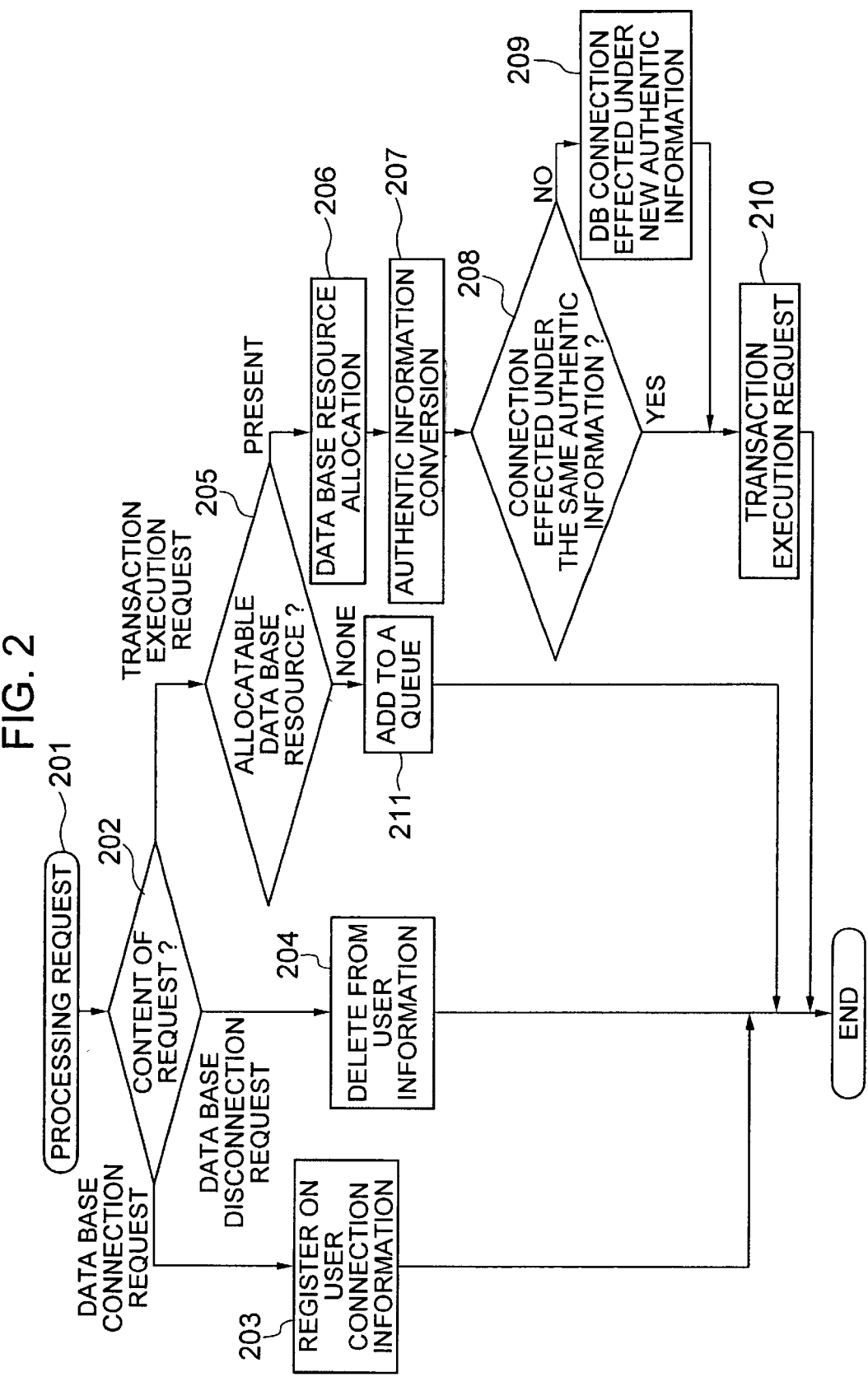
FIG. 2 is a flow chart of an example of a database server processing.
Figure 3:
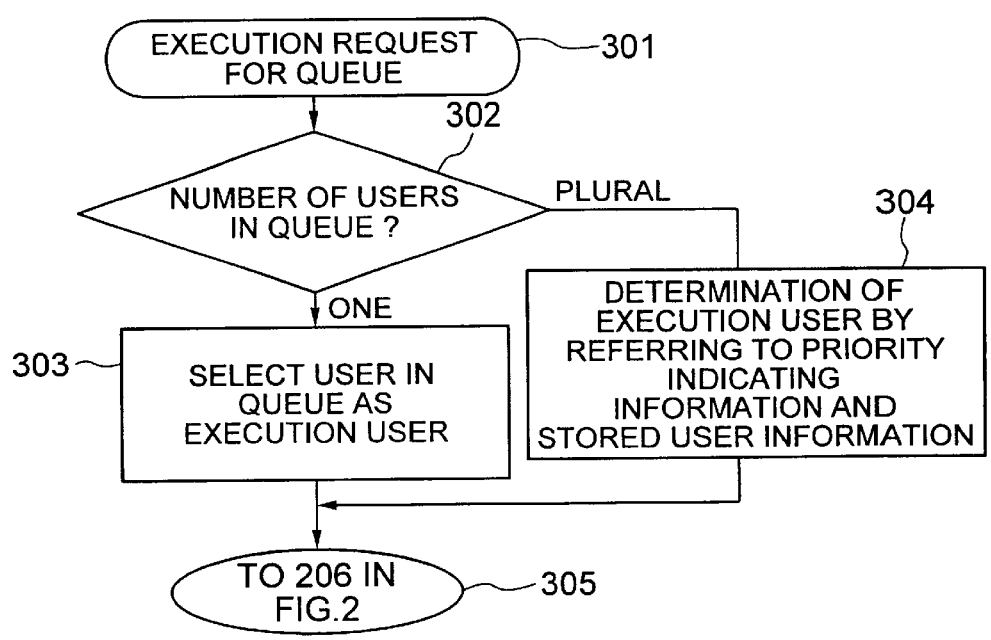
FIG. 3 is a flow chart of an example of a database server processing when there is a queue.

FIGS. 2 and 3 are flow charts each showing an example of a database server processing.

Figure 4:
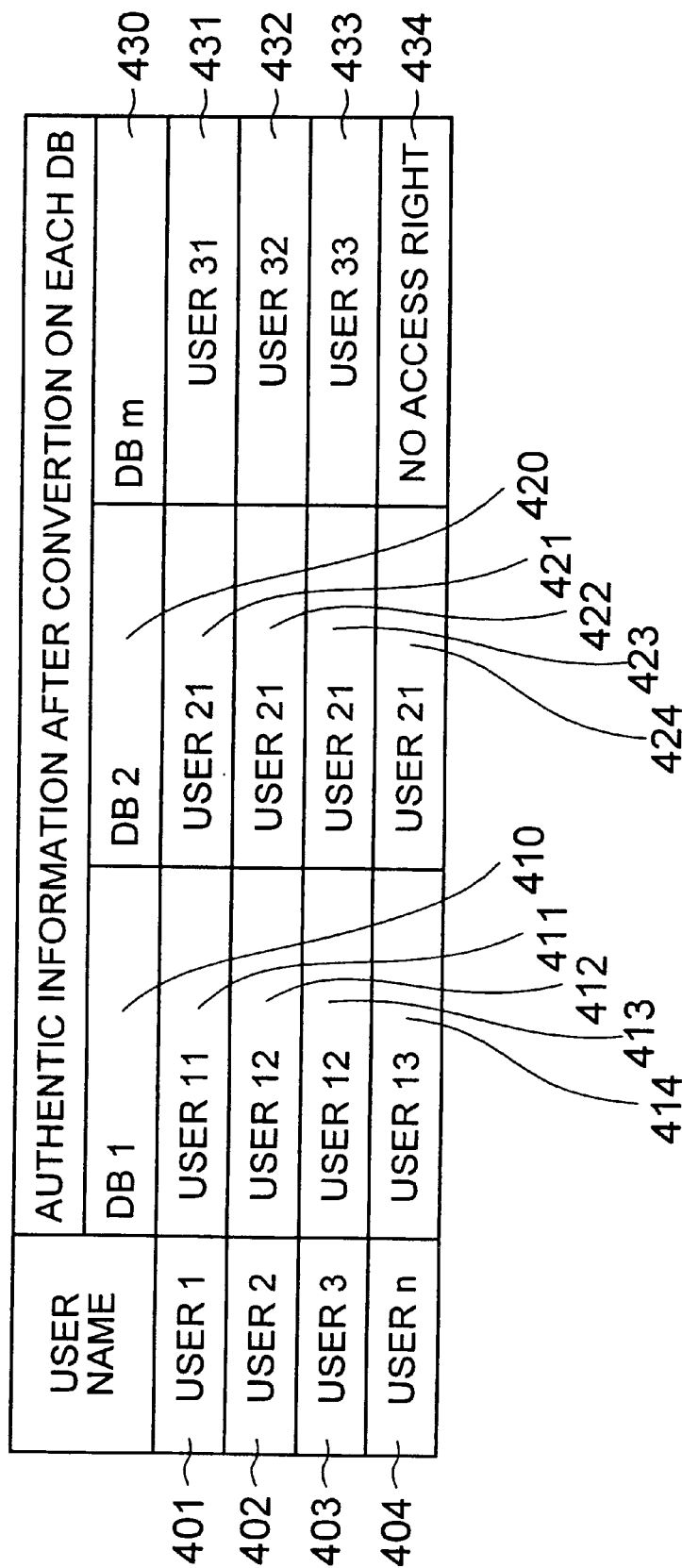
FIG. 4 is a table showing an example of authentic informations after conversion.

FIG. 4 shows an example of conversion information for user authentic information.

This example illustrates that the authentic information of a user 1 (401) is converted into authentic information of a user 11 (411) on a database DB1(410), and that it is converted into authentic information of user 21(421) and 31(431) on a database DB2(420) and a database DBm(430), respectively.

Similarly, it illustrates that the authentic information of user 2(402) is converted into authentic information of user 12(412), 21(422), and 32(432) on the database DB1(410), DB2(420), and DBm(430), and that the authentic information of user 3(403) is converted into authentic information of user 12(413), 21(423), and 33(433).

Furthermore, it illustrates that the authentic information of user n(404) is converted into authentic information of user 13(414) and 21(424) on the database DB1(410) and DB2 (420), though it is converted on the database DBm (430) into an authentic information of no access right (434).

In the conversion of authentic information, the authentic information of users who have an identical database access right to a database are replaced by one authentic information.

FIG. 5 illustrates an example of priority indicating information.

This example illustrates that the higher the value of indicating information, the higher the priority and that a user 1(501) has a priority 50(511), user 2(502) priority 10(512), user 3(503) priority 50(513), and user n(504) priority 10(514).

FIG. 6 illustrates an example of stored user information.

This example illustrates a case where the average processing time about the processings which had been made is stored for respective users. A user 1(601) had an average processing time of 30 ms (611), user 2(602) 100 ms (612), user 3(603) 50 ms (613), and user n(604) 20 ms (614).

Figure 7:
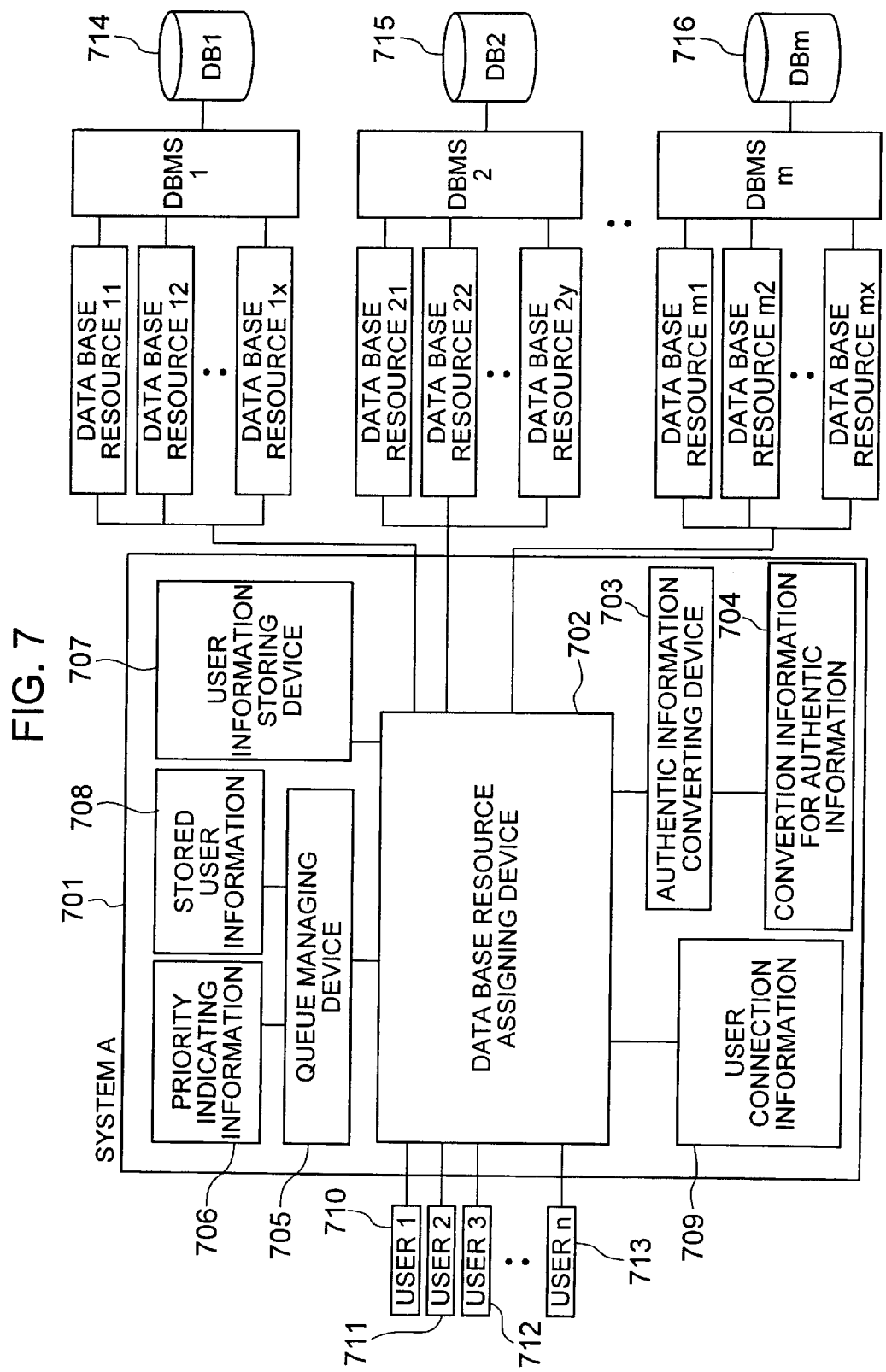
FIG. 7 is a drawing showing an example of an arrangement of a database server provided with a plurality of database systems, each having a plurality of database resources.

FIG. 7 illustrates an example of effecting processings with a plurality of database systems, each having a plurality of database resources.

Referring to FIG. 1, 102 is a database resource allocating device, 103 authentic information conversing device, 104 conversion information for authentic information, 105 queue managing device, 106 priority indicating information, 107 user information accumulating device, 108 authentic user information, and 109 user connection information, where the system A (101) includes from the database resource allocating device 102 to the user connection information 109.

Reference numeral 110 is a database (DB1) accessible from the system A, 111 is a database management system (DBMS1) managing the database DB1, 112 is a database resource which is necessary for effecting one database processing at the same time by the database DB1 and the database management system DBMS1.

The database DB1 and the database management system DBMS1 may be on the same computer as the system A, or on different computers.

Reference numerals 113, 114 and 115 are users who DBMS1 to effect database processings through the system A.

Next, an example of the database server processing method according to the present invention is described with reference to FIG. 2 using a work example where one database resource is used to effect processings required by three users.

First, a case where no queue occurs is illustratively described.

The database resource allocating device places connection information in the user connection information (203) in response to database connection requests from users 1, 2 and 3, but does not perform actual database processings.

Then, when a transaction execution request is received from the user 1, the database resource allocating device allocates the database resource to the user 1 (206), since the database resource has not been used yet (205).

In this case, the user 1 is allowed to occupy the database resource in a minimum transaction unit ensured with the equivalency to the database processing.

The authentic information converting device converts the authentic information of user 1(401) into the authentic information of user 11(411) on the DB1(410) on the basis of the conversion information for user authentic information as shown in FIG. 4 (207), then the transaction is executed (210) by connecting to the database DB1 under the authentic information of user 11.

Then, after the transaction for the request by the user 1 is completed, on receiving the transaction execution request from the user 2, the database resource is allocated to the user 2.

The authentic information converting device converts the authentic information of user 2(402) into the authentic information of user 12(412) on the database DB1(410). Since the database resource has already been connected to the database under the authentic information of user 11, the connection is revised to a connection under the authentic information of user 12 (209), thereafter the transaction is executed.

Then, after the transaction for the request by the user 2 is completed, on receiving the transaction execution request from the user 3, the database resource is allocated to the user 3.

The authentic information converting device converts the authentic information of user 3(403) into the authentic information of user 12(413) on the database DB1(410).

Since the database resource has already been connected to the database under the authentic information of user 12, the transaction is executed without revising the connection.

For the database disconnection requests from users, the database resource allocating device deletes the connection informations from the user connection information (204).

Secondly, a case where a queue occurs is illustratively described with reference to FIGS. 2 and 3.

When a transaction execution request from the user 1 under the condition of no database resource being available, the user 1 is added to the queue (211) and gets into a waiting state.

When the database resource becomes available, the queue managing device runs the transaction execution request by the user who has been in the waiting state (301).

In a case only one user is present in the queue, that user is taken as an execution user (303), to whom the database resource is allocated (305).

In a case where there are a plurality of users in the queue, a user whose execution request is to be executed is selected from them based on the priority indicating information as shown in FIG. 5 as well as the stored user information as shown in FIG. 6 which have been obtained by storing information about past transaction processings requested by respective users with a user information storing device (304).

When both the user 1 and the user 2 are in the queue and an available database resource is obtained, referring to the priority indicating information (FIG. 5), the priority of the user 1(501) is 50(511), while that of the user 2(502) is 10(512). Therefore, the request by the user 1 having a higher priority is executed in advance.

When both the user 1 and the user 3 are in the queue and an available database resource is obtained, referring to the priority indicating information (FIG. 5), both have the same priority of 50(511, 513). Therefore, the stored user information (FIG. 6) should be referred to.

The user 1(601) has an average processing time of 30 ms(611), while the user 3(603) has that of 50 ms(613). Therefore, the request by the user 1 whose average processing time is shorter is executed in advance.

FIG. 7 shows a database server system which can be arranged by applying the database server as described above and as shown in FIG. 1 as a database server to a plurality of database systems, each having a plurality of database resources.

As a third embodiment, referring to FIG. 7, a case where as to each of the database DB1 (714) and DB2(715), first the user 1(710) connects to the database and executes a transaction, and after it is completed, the user 2(711) is going to connect the same database.

In this example, the user 1(401) is connected under the authentic information of user 11(411) on the database DB1 (410) and under the authentic information of user 21(421) on the database DB2(420) based on the conversion information for user authentic information as shown in FIG. 4.

The user 2(402) is connected under the authentic information of user 12(412) on the database DB1 and under the authentic information of user 21(422) on the database DB2 (420).

Therefore, there may be an example where there are a plurality of unoccupied database resources, a transaction requested by the user 1 is executed, and after it is completed, a transaction execution request is received from the user 2. On the database DB1, the request by the user 1 is connected to execute the transaction under the authentic information of user 11, while the request by the user 2 is connected to execute the transaction using a different unoccupied database resource under the authentic information of user 12.

In contrast, on the database DB2, the request by the user 1 is connected to execute the transaction under the authentic information of user 21, while the request by the user 2 is connected to execute the transaction using the database resource which has been in a connected state under the authentic information of user 21 in accordance with the request by the user 1.

As described above, according to the present embodiment, effective utilization of database resources as well as an increase of the number of users connectable at the same time to a database server can be achieved by reducing the time of occupying database resources by database users.

Moreover, some database connection-disconnection process can be omitted by allowing users who have the same access right to pretend to be the same user for databases.

Moreover, the execution priorities of users who are in queue are determined on the basis of stored information of past database accesses to improve the processing efficiency, thereby reducing the response time to database users.

According to the present invention, effective utilization of database resources as well as an increase of the number of users connectable at the same time to a database server can be achieved by reducing the time of occupying database resources by database users.

What is claimed is:

1. A database processing method, comprising the steps of:
   storing connection requests from users in response to database connection processing requests by at least one user requiring database processing;
   making the user occupy a database resource of a database system, in response to a transaction execution request from the user, with a minimum transaction unit ensured with an equivalency to a database processing;
   executing a transaction stored in the database resource;
   assigning, for each user, authentic information in response to an access right for each user for each of the databases;
   replacing a plurality of logical authentic information with a physical authentic information for access to a database, the logical authentic information of each of users requesting a database processing request and having a database access right with same levels as other users; and
   executing a transaction without carrying out both database disconnection processing and database reconnection processing for the database, when a database resource is being connected with a database with the physical authentic information used and the physical authentic information is identical with an authentic information associated with the transaction to be executed.

2. A computer readable recording medium recording a database processing program, including:
   a program of storing connection requests from users in response to database connection processing requests by the users requesting at least one database processing;
   a program for making the users occupy a database resource of a database system with a minimum transaction unit ensured with an equivalency to the database processing in accordance with transaction execution requests from the users;
   a program of replacing a plurality of logical authentic information with a physical authentic information for access to a database, the logical authentic information of each of users requesting a database processing request and having a database access right with same levels as other users; and
   a program of executing a transaction without carrying out both database disconnection processing and database reconnection processing for the database, when a database resource is being connected with a database with the physical authentic information used and the physical authentic information is identical with an authentic information associated with the transaction to be executed.

3. A computer program for executing a database processing method, including:
   a step of storing connection requests from users in response to database connection processing requests by the users requesting at least one database processing;
   a step of making the users occupy a database resource of a database system with a minimum transaction unit ensured with an equivalency to the database processing in accordance with transaction execution requests from the users;
   a step of executing a transaction stored in the database resource;
   a step of replacing a plurality of logical authentic information with a physical authentic information for access to a database, the logical authentic information of each of users requesting a database processing request and having a database access right with same levels as other users; and a step of executing a transaction without carrying out both database disconnection processing and database reconnection processing for the database, when a database resource is being connected with a database with the physical authentic information used and the physical authentic information is identical with an authentic information associated with the transaction to be executed.

4. A database processing apparatus, comprising:

a user connection information recording unit for storing connection requests from users in response to database connection processing requests by at least one user requiring database processing; and a database resource allocation unit for making the user occupy a database resource of a database system, in response to a transaction execution request from the user, with a minimum transaction unit ensured with an equivalency to a database processing, and execute a transaction stored in the database resource, wherein a plurality of logical authentic information are replaced with a physical authentic information for access to a database, the logical authentic information of each of users requesting a database processing request and having a database access right with same levels as other users; and wherein a transaction is executed without carrying out both database disconnection processing and database reconnection processing for the database, when a database resource is being connected with a database with the physical authentic information used and the physical authentic information is identical with an authentic information associated with the transaction to be executed.

* * * * *